United States Patent
Sukhomlinova et al.

(10) Patent No.: US 9,134,551 B2
(45) Date of Patent: Sep. 15, 2015

(54) WIDE BAND VARIABLE TRANSMITTANCE OPTICAL DEVICE AND MIXTURE

(75) Inventors: Ludmila Sukhomlinova, Kent, OH (US); Volodymyr Bodnar, Kent, OH (US); Christine Martincic, Cuyahoga Falls, OH (US); Linli Su, Cupertino, CA (US); Bahman Taheri, Shaker Heights, OH (US); Tamas Kosa, Hudson, OH (US)

(73) Assignee: ALPHAMICRON INCORPORATED, Kent, OH (US)

( * ) Notice: Subject to any disclaimer, the term of this patent is extended or adjusted under 35 U.S.C. 154(b) by 237 days.

(21) Appl. No.: 13/877,508

(22) PCT Filed: Oct. 4, 2011

(86) PCT No.: PCT/US2011/054701
§ 371 (c)(1),
(2), (4) Date: Jun. 13, 2013

(87) PCT Pub. No.: WO2012/047843
PCT Pub. Date: Apr. 12, 2012

(65) Prior Publication Data
US 2013/0258266 A1   Oct. 3, 2013

Related U.S. Application Data

(60) Provisional application No. 61/389,444, filed on Oct. 4, 2010.

(51) Int. Cl.
*C09K 19/02* (2006.01)
*G02F 1/00* (2006.01)
(Continued)

(52) U.S. Cl.
CPC .............. *G02F 1/0045* (2013.01); *C09K 19/02* (2013.01); *C09K 19/601* (2013.01); *G02F 1/13725* (2013.01); *G02F 1/133305* (2013.01)

(58) Field of Classification Search
USPC .................................................. 349/168–186
See application file for complete search history.

(56) References Cited

U.S. PATENT DOCUMENTS

| 4,150,878 A | 4/1979 | Barzilai et al. ................ 350/344 |
| 4,279,474 A | 7/1981 | Belgorod .................. 350/331 R |

(Continued)

FOREIGN PATENT DOCUMENTS

| JP | 60219262 A | * 11/1985 | .............. C09B 31/00 |
| WO | WO 99/67681 | 12/1999 | ............. G02G 1/139 |

OTHER PUBLICATIONS

International Search Report mailed Jan. 13, 2012 in corresponding application No. PCT/US2011/054701.

(Continued)

*Primary Examiner* — Hoan C Nguyen
(74) *Attorney, Agent, or Firm* — Renner Kenner Greive Bobak Taylor & Weber

(57) ABSTRACT

We describe a wide band variable transmission optical device, mixtures for use in such a device, and methods of making the same. The wide band optical device includes a cell comprising a guest-host mixture of a liquid crystal host and a dichroic guest dye material contained between a pair of plastic substrates. The optical device does not use polarizers. The liquid crystal host has an axis orientation that is alterable between a clear state orientation and a dark state orientation perpendicular thereto and the dichroic guest dye material includes one or more dichroic dyes. The optical device is characterized in that it exhibits a wide absorption band that is greater than 175 nm within a visible wavelength range of 400-700 nm and has a clear state transmission equal to or above 30% and a dark state transmission equal to or below 40%.

15 Claims, 7 Drawing Sheets

(51) Int. Cl.
*C09K 19/60* (2006.01)
*G02F 1/137* (2006.01)
*G02F 1/1333* (2006.01)

(56) References Cited

U.S. PATENT DOCUMENTS

| | | | |
|---|---|---|---|
| 4,281,903 A | 8/1981 | Gharadjedaghi | 350/349 |
| 4,383,738 A * | 5/1983 | Funada et al. | 349/180 |
| 4,414,131 A * | 11/1983 | Sethofer et al. | 252/299.1 |
| 4,511,225 A | 4/1985 | Lipson | 351/49 |
| 4,608,558 A * | 8/1986 | Amstutz et al. | 345/94 |
| 4,756,605 A | 7/1988 | Okada et al. | 350/347 V |
| 4,795,248 A | 1/1989 | Okada et al. | 351/158 |
| 4,968,127 A | 11/1990 | Russell et al. | 351/44 |
| 5,015,086 A | 5/1991 | Okaue et al. | 351/44 |
| D321,701 S | 11/1991 | Nomura et al. | D16/102 |
| 5,067,795 A | 11/1991 | Senatore | 359/84 |
| 5,114,218 A | 5/1992 | Black et al. | 351/44 |
| 5,172,256 A | 12/1992 | Sethofer et al. | 359/77 |
| 5,608,567 A | 3/1997 | Grupp | 359/275 |
| 5,710,609 A | 1/1998 | Shimada | 349/126 |
| 5,712,721 A | 1/1998 | Large | 359/245 |
| 5,876,627 A | 3/1999 | Kaneko et al. | 252/299.62 |
| 6,033,598 A * | 3/2000 | Kaneko et al. | 252/299.1 |
| 6,239,778 B1 | 5/2001 | Palffy-Muhoray et al. | 345/87 |
| 2004/0047056 A1 * | 3/2004 | Sekiguchi et al. | 359/883 |
| 2006/0007371 A1 | 1/2006 | Miyatake et al. | 349/96 |
| 2006/0147652 A1 * | 7/2006 | Liu et al. | 428/1.31 |
| 2008/0292817 A1 | 11/2008 | Takaku et al. | 428/1.1 |

OTHER PUBLICATIONS

Written Opinion mailed Jan. 13, 2012 in corresponding application No. PCT/US2011/054701.

Demand as filed in corresponding application No. PCT/US2011/054701 Aug. 3, 2012.

F. Gharadjedaghi; *A Positive Contrast Guest-Host Display Using a Liquid Crystal of Negative Dielectric Anisotropy*; Physics Group 1981 (pp. 127-135).

English language translation of Office Action mailed Feb. 4, 2015 in corresponding Chinese application No. 2011800523070.

Uchida et al., Dichroic Dyes for Guest-Host Interactions in Liquid Crystals; 1976; Molecular Crystals and Liquid Crystals; 34:7; 153-158; DOI: 10.1080/15421407708084302.

Uchida et al., *Guest-Host Interactions in Nematic Liquid Crystal Cells with Twisted and Tilted Alignments*; 1979; Molecular Crystals and Liquid Crystals; 54:3-4; 161-174; DOI: 10.1080/00268947908084850.

* cited by examiner

WIDE BAND VARIABLE TRANSMITTANCE OPTICAL DEVICE AND MIXTURE

CROSS-REFERENCE TO RELATED APPLICATIONS

This application claims priority to, and any other benefit of, International Patent Application No. PCT/US2011/054701, filed Oct. 4, 2011, which claims priority of U.S. Provisional Patent Application Ser. No. 61/389,444, entitled WIDE BAND VARIABLE TRANSMITTANCE OPTICAL DEVICE AND MIXTURE, filed Oct. 4, 2010, the entire disclosure of which is fully incorporated herein by reference.

BACKGROUND

Variable transmission eyewear devices (glasses, goggles, visors, etc.) that can quickly change between a high-transmission "clear" state and a low-transmission "dark" state have many advantages over fixed transmission eyewear and are highly desirable. An especially useful feature is the ability to make this quick change occur on demand, whether manually, at the touch of a button by the wearer, or automatically, under the control of a light sensor and an electronic circuit.

Previous attempts to create on-demand variable transmission eyewear have employed a variety of liquid crystal systems, using the ability of liquid crystal molecules to alter their orientation with the application of an external electric field.

Liquid crystal devices can be broadly categorized as polarizer-based (which contain, at least, one polarizer) or guest-host systems. The polarizer-based systems are used in applications where the dark state transmission is the most important parameter. In particular, they are used when it is necessary to obtain minimal transmission (nearly zero) conditions. Such applications include flat panel displays as well as welding helmets and 3D glasses. However, polarizers limit the amount of light transmission of the device, often well below a theoretical limit of only 50% transmission. Guest-host systems, on the other hand, were traditionally used for display applications where the wide viewing angle and/or true color saturation were important. Examples include cockpit displays that allow the pilot and co-pilot to observe the same image. Guest-host systems are better suited for eyewear devices since they allow for potential light transmission levels above 50%. In fact, some patents (see e.g. Palffy-Muhoray et al., U.S. Pat. No. 6,239,778, Issued May 29, 2001) suggest use of guest-host for eyewear applications wherein the guest-host device is comprised of a mixture of a liquid crystal "host" and a dichroic dye "guest" contained between a pair of substrates. The liquid crystal "host" includes non-polarizing liquid crystal material having an axis of orientation that is alterable by adjustment of voltage applied across the substrates that can change between a clear-state orientation and a dark-state orientation perpendicular thereto. The dye "guest" mixture comprises dichroic dyes which are dissolved within the liquid crystal host and which align with the orientation of the liquid crystal material. A commercial embodiment of this approach is the Magic™ Ski Goggles, which uses a guest-host liquid crystal system and plastic substrates (Park et al., U.S. Pat. No. 7,567,306, issued Jul. 28, 2009).

Generally, it is desirable for such variable transmittance liquid crystal optical devices to have good optical properties while using plastic substrates, to exhibit a wide transmission swing (a wide difference between the clear and the dark states) and to absorb light across the broadest possible band in order to minimize the difference in color between the clear and dark states.

There is however no current commercial liquid crystal guest-host device that provides wideband absorption greater than 175 nm for eyewear applications. This is because knowledge relating to the use of guest-host systems has been based on previous knowledge of display applications, which provide no guidance as to the parameters necessary to make a successful wideband eyewear device. Liquid crystal displays have very different performance requirements than eyewear devices. For example, liquid crystal displays traditionally use glass substrates, whereas optical devices suitable for eyewear are preferably plastic based. Glass and plastic have very different properties; the sensitivity of the eye to certain parameters makes plastic products, which may be viable for display applications, unacceptable for eyewear applications. For example, non-uniformity in the visual distortions is paramount in eyewear applications. As such, traditional display materials or configurations are rendered unacceptable for eyewear applications.

Analytical parameters used to characterize guest-host systems include absorption spectrum, order parameter of the mixture, type of dielectric anisotropy (positive or negative), and the nematic to isotropic temperature ($T_{NI}$) of the liquid crystal-guest mixture (B. Bahadur. "Dichroic liquid crystal displays." In *Liquid Crystals—Applications and Uses* (Vol. 3) (pp. 65-208), 1992, Singapore: World Scientific). In addition, a device can be characterized by the type of substrate and thickness used, liquid crystal alignment in absence of an electrical field, thickness of the cell, the swing in the transmission, optical distortion, and the cell gap of the cell as well as the pitch of a chiral liquid crystal and the "thickness to pitch" ratio (d/p) of the mixture. The performance of any device is dictated by the choice of these parameters, which themselves are inter-related. But, there is no analysis or description of the exact nature of the interplay between the parameters in commercial guest-host devices.

For example, one difficulty in defining any parameters for eyewear applications has been the inherent conflict between the properties of various components used in a guest-host system. This can lead to a perceived physical limitation on the performance. For example, Applicants have found that a large transmission swing between the clear state transmission and the dark state transmission is achieved by using high performing dichroic dyes. However, such dyes have intrinsically lower solubility, can disrupt liquid crystalline phase, and alter the nematic to isotropic phase transition temperature, $T_{NI}$. Furthermore, such dyes dictate a higher degree of polarization dependence in the performance. "Polarization dependence" is a measure of a material's response to two orthogonal polarizations; i.e. where the optical properties of a material experienced by an incident light (such as index of refraction or absorption/transmittance) are dependent on the polarization of the incident light. An increase in polarization dependence can in turn reduce the swing in the transmission between the clear and dark states. Furthermore, this property may also become undesirable because a higher polarization dependence can reveal even small structural imperfections within the liquid crystal cell configuration and/or any plastic substrates used for the technology. Since the eye can easily pick out even minor variations in the field of vision, traditional systems using high performing dyes had poor optical performance.

The polarization dependence of a chiral nematic guest-host system depends upon how tightly twisted the liquid crystal molecules are (i.e. their "pitch") in relation to the thickness of the liquid crystal layer. This ratio is measured by a parameter known as "thickness to pitch ratio" or "d/p". It is known that the larger the d/p of a liquid crystal mixture, the less polarization dependent it is. For example, one way to reduce the polarization dependence of a device is to use a liquid crystal mixture with short pitch (<3 micron) in a thin cell (<3 microns) and a twisted structure with a thickness to pitch ratio (d/p) of >0.9. However, in addition to the fact that this makes manufacturing extremely difficult and has prevented production, using 3 micron cell rather than thicker cells can also reduce the clear and dark state transmission due to the surface alignment effect, in which the liquid crystal molecules are less responsive to an applied electric field because of the proximity of the two surfaces. This, in turn, can lead to a smaller transmission swing and hence a reduction in performance.

An approach to circumvent this obstacle is to trick the eye into not seeing imperfections in the cell or the plastic substrates. This can be done if the device exhibits strong color dependence in the absorption spectra. In other words, to avoid the eye seeing these imperfections, a guest-host system with strong color (i.e. a narrow absorption spectrum of <150 nm) is used. But such devices are limited in their transmission swing and/or have a relatively narrow absorption band. As such, they do not fulfill the need for a wide band optical device.

Therefore, there is still a need for a variable transmittance liquid crystal optical device with good optical properties that uses plastic substrates, exhibits a wide transmission swing and has a broad absorption band (>175 nm).

We have discovered, and describe herein, a set of material and system parameters, based on physical characteristics, and device configurations that can circumvent these obstacles and can accomplish the desired system requirements described above.

SUMMARY OF INVENTION

Disclosed herein are variable transmission optical devices and methods of making the same. Each optical device includes a cell comprising a guest-host mixture of a liquid crystal host and a dichroic guest dye material contained between a pair of plastic substrates. The liquid crystal host has an axis orientation that is alterable between a clear state orientation and a dark state orientation perpendicular thereto. The dichroic guest dye material comprises one or more dichroic dyes. The optical device does not use polarizers. The optical device exhibits a wide absorption band that is greater than 175 nm within a visible wavelength range of 400-700 nm, has a clear state transmission equal to or above 30% and a dark state transmission equal to or below 40%.

In some embodiments, the absorption band is greater than 180 nm, 185 nm, 190 nm, 195 nm or 200 nm.

In some embodiments, the clear state transmission is equal to or above 35%, 40%, 45%, 50%, 55%, 60%, 65% or 70%. In some embodiments, the dark state transmission may be equal to or below 35%, 30%, 25%, 20%, 15% or 10%.

In some examples, the liquid crystal host has a thickness to pitch ratio (d/p) of less than 0.9 but greater than 0.25. In other embodiments, the liquid crystal host has a thickness to pitch ratio (d/p) of less than 0.8 or less than 0.7.

In some embodiments, the guest-host mixture has a dichroic ratio $D_{mix}$ greater than 11.5. In other embodiments, the dichroic ratio $D_{mix}$ is greater than 12, or greater than 12.5, or greater than 13.

In some embodiments, the pair of plastic substrates have an optical retardation with less than ±20% variation in uniformity across the area of the device. In other examples, the plastic substrates have an optical retardation variation of less than ±15%, or less than ±10%.

In some embodiments, the guest-host mixture includes one or more dichroic dyes in the dichroic guest dye material which are azo-based dyes having at least two azo groups. In some embodiments, the dichroic dyes have 2-6 azo groups. In other embodiments, the dichroic dyes have 2-10 azo groups.

The optical devices have a cell with a cell gap greater than 3 microns but less than 20 microns. In some examples, the cell gap is equal to or greater than 5 microns but less than 15 microns.

In some embodiments, the optical device has a transmission swing greater than or equal to 30%. In other examples, the optical device has a transmission swing of 35%, 40%, 45%, 50%, 55% or 60%.

In some embodiments, the guest-host mixture has a nematic-isotropic transition temperature $T_{NI}$ greater than 40° C. In other embodiments, the $T_{NI}$ is greater than 45° C., 50° C., 55° C., 60° C., 65° C., 70° C., 75° C., 80%, 85% or 90° C.

In some embodiments, the optical device has a guest-host mixture with an order parameter, $S_{mix}$, greater than 0.78. In other embodiments, the guest-host mixture has an order parameter greater than or equal to 0.79. In yet other embodiments, the guest-host mixture has an order parameter greater than or equal to 0.8.

In one embodiment, the optical device has a liquid crystal host that comprises a chiral nematic material with a thickness to pitch ratio (d/p) of less than 0.9; a guest-host mixture comprising one or more dichroic dyes with a dichroic ratio greater than 11.5; and a nematic-isotropic transition temperature $T_{NI}$ greater than 60° C. The device has plastic substrates with an optical retardation variation of less than ±20%; and a cell gap greater than 3 microns. In some embodiments, the device has a transmission swing greater than or equal to 30%. In other embodiments, the device has a transmission swing greater than or equal to 40%;

Also disclosed herein are wide band mixtures for use in any of the optical devices described above and methods of making the same.

BRIEF DESCRIPTION OF THE DRAWINGS

This and other features and advantages of the present invention will become better understood with regard to the following description, appended claims, and accompanying drawings wherein:

DETAILED DESCRIPTION

Figure 1A:
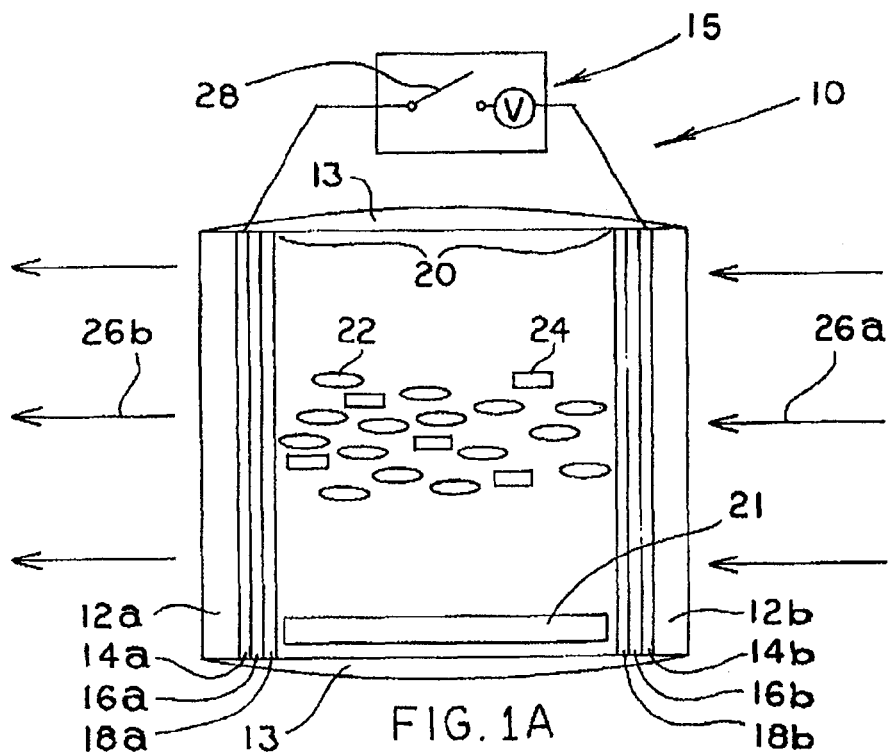
FIGS. 1A and 1B are enlarged schematic cross-sectional representations of a cell according to the present invention.

Applicants here describe an electro-optical variable transmission device, herein referred to as a "wide band" device, that exhibits a wide absorption band (>175 nm) or neutral tint, and a wide (>30%) transmission swing (high contrast between its clear and dark states). Also described are mixtures for use in such devices, referred to herein as "wide band" mixtures; and methods of making said wide band mixtures and devices.

The "wide band" mixture is achieved when a guest-host liquid crystal mixture comprises the following properties: (i) a negative dielectric anisoptropy liquid crystal host comprising a chiral nematic material in a cell such that the thickness to pitch ratio (d/p) is less than 0.9; (ii) a dichroic dye or mixture of dyes with a positive dichroic ratio >11.5 in the liquid crystal host, (iii) a guest-host mixture with an effective order parameter, $S_{mix}$, of greater than 0.78; and (iv) such mixture having a nematic-isotropic transition temperature $T_{NI}$ greater than 40° C. A wide band device is achieved by placing a "wide band" mixture in between two transparent plastic substrates with uniform (i.e. less variation than ±20%) optical retardation in a liquid crystal device configuration with a cell gap >3 micron in order to form a wide band device.

DEFINITIONS

"Absorption" as used herein is to define the percentage of light not transmitted through the cell or optical device. It is related to transmission by the following: absorption=100%−transmission. As used herein, "transmission" and "transmittance" are used interchangeably and mean the percentage of light that is transmitted through a device.

"Absorption band" is defined as the spectral wavelength wherein absorption occurs.

"Clear state" or "clear state transmission", as used herein, refers to the state where the guest-host mixture exhibits maximal light transmittance.

"Dark state" or "dark state transmission" refers to the state where the guest-host mixture exhibits minimal light transmittance.

"Dichroic ratio", "average dichroic ratio" or $D_{mix}$ of the mixture, similarly, refers to the dichroic ratio of the guest-host mixture which may contain one or more dichroic dyes. The mixture dichroic ratio may be measured using the formula for Effective Dichroic Ratio ($D_{eff}$) or Aggregate Effective Dichroic Ratio ($D_{eff-agg}$). Thus, as used herein, $D_{mix}$, $D_{eff}$ or $D_{eff-agg}$ are used interchangeably (depending on which method is used to measure the dichroic ratio) and describe the same parameter.

Nematic-isotropic transition temperature or $T_{NI}$ is the temperature at which the liquid crystal undergoes the nematic to isotropic transition, which is the transition from the orientationally ordered nematic phase to the totally disordered isotropic phase. As used herein, $T_{NI}$ refers to the nematic-isotropic transition temperature of the guest-host mixture.

"Optical Device" refers to a device where the light transmission through the device can be controlled by application of a voltage. Such devices include eyewear (such as sunglasses, ophthalmic glasses or lenses, eye protectors, visors, head mounted displays, etc), front layer of auto-dimming mirrors and windows.

"Order parameter of the guest-host mixture" or "$S_{mix}$" refers to the order parameter of the guest-host mixture. The mixture may contain one or more dyes as well as other dopants. The $S_{mix}$ can be measured according to the method described herein, e.g. using the formula for Effective Order Parameter ($S_{eff}$) or Aggregate Effective Order Parameter ($S_{eff-agg}$). As used herein $S_{mix}$, $S_{eff}$ and $S_{eff-agg}$ are used interchangeably (depending on which method is used to measure the order parameter) and describe the same parameter.

"Polarization dependence" is a measure of a material's response to two orthogonal linear polarizations; i.e. where the optical properties of a material experienced by an incident light (such as index of refraction or absorption/transmittance) are dependent on the polarization of the incident light.

"Polarization sensitivity" is the relative measure of the response of the material between the two orthogonal linear polarizations. Zero percent (0%) polarization sensitivity refers to a polarization insensitive device and a 100% polarization sensitivity refers to a completely polarization sensitive device as obtained using a polarizer.

"Polarizer" refers to a material that absorbs or reflects one polarization on incident light more than the orthogonal polarization.

"Transmission swing" refers to the difference in transmission between the clear state and dark state transmissions. For example, if the clear state transmission is 65% and the dark state transmission is 15%, the transmission swing is 40%. The transmission swing of an optical device can be measured using equipment such as a "haze-gard plus" device from BYK-Gardner, USA, or equivalent.

"Uniform optical retardation" refers to plastic substrates having an optical retardation variation that is less than ±20. "Optical retardation" is defined as the change in the optical phase experienced by different polarizations of incident light.

"Wide band absorption" as used herein, is defined as a spectral absorption band that is greater than 175 nm, and preferably greater than 180 nm, 185 nm, 190 nm, 195 nm or 200 nm, where the entire spectral absorption band is contained within the range of visible wavelengths, typically assumed to be 400 nm-700 nm (See FIG. 1)

"Wide Band Device" refers to a device that exhibits a wide absorption band, and a wide (i.e. >30%) transmission swing with polarization sensitivity of less than 20%, or in some examples less than 15%, or in some examples less than 10%.

"Wide Band Mixture" refers to a guest-host liquid crystal mixture that can be used in a wide band device.

The Liquid Crystal Cell

Figure 1B:
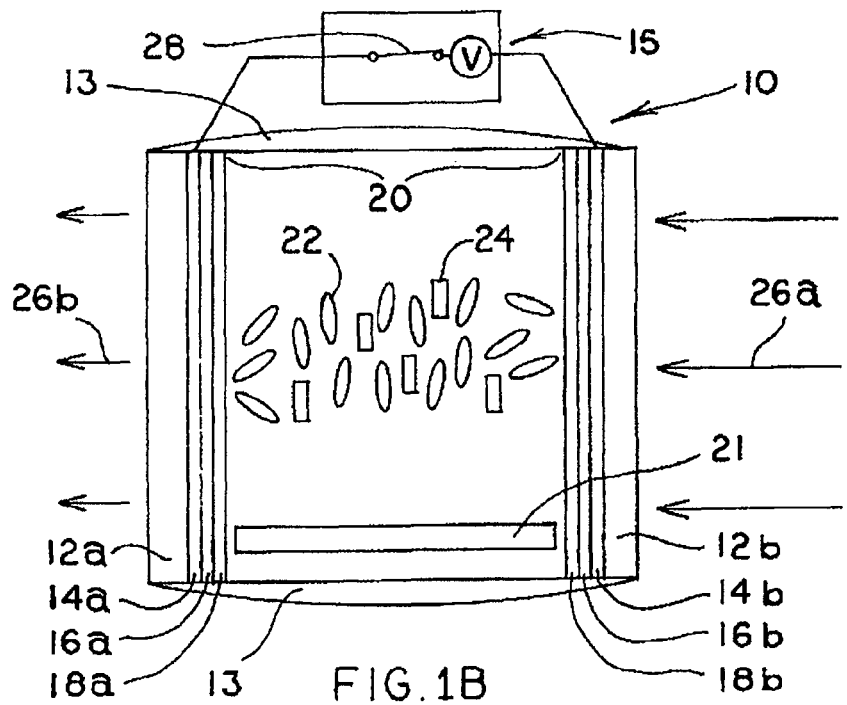

FIGS. 1A and 1B generally show an electronically controlled liquid crystal cell whereby light transmission is continuously controllable. As seen in FIGS. 1A-B, a variable light transmission guest-host cell according to the present invention is designated generally by the numeral 10. The cell 10 includes two substrates, 12a, 12b, with a substantially constant separation between them and enclosed on all sides by a sealing material 13, such as a UV cured optical adhesive. As will be discussed in further detail below, a solution of dichroic dye and a liquid crystalline material is disposed between the substrates 12a and 12b.

Substrates 12a, 2b are plastic, low-birefringence, light transmissive materials, either the same or different. The inner surfaces of the substrates are coated with a transparent conducting layer, 14a, 14b, such as indium tin oxide (ITO) or conductive polymer. Both conducting layers 14a and 14b are connected to a power circuit 15. The power circuit 15 includes at least a variable voltage supply which is represented schematically in FIGS. 1A and 1B by the encircled V. Coating the inside of each conducting layer 14 may be an optional passivation layer (also known as an insulating layer or "hard coat"), 16a, 16b, comprising, for example, a Si, Ti alcoxide. The innermost layer is an alignment layer, 18a, 18b, which can also act as a passivation layer.

Substrates 12a, 12b can be planar or curved. The distance between substrates 12a, 12b has ramifications on properties of the cell. If the host is a liquid crystal material, increasing the distance between the substrates 12a and 12b tends to reduce the possibility of making a polarization insensitive device; decreasing the distance tends to decrease the light-absorption capacity of the cell and increase the difficulty of manufacturing. This distance defines a cell thickness 20 and in some examples is from 3 to 20 µm, or from 5 to 10 µm. To aid in maintaining the separation, optional spacers 21, such as glass or plastic rods or beads, may be inserted between the substrates 12a and 12b.

The guest-host solution of the present invention includes a guest dichroic dye 24 in a liquid crystal host material 22. Dichroic dye 24 is an organic molecule (or mixture of molecules) whose absorption of polarized light strongly depends on the direction of polarization relative to the absorption dipole in the molecule. Dichroic dye 24 has positive dichroism in which a maximal absorption occurs when the polarization is parallel to the long molecular axis of the dye molecule and a minimal absorption occurs when the polarization is perpendicular to the long axis. The dichroic dye 24 is further described below.

Liquid crystals are inherently birefringent which can result in polarization sensitivity of the device. Preferably, liquid crystal material 22 is either chiral nematic or achiral nematic supplemented with a chiral dopant. The liquid crystal material 22 may include more chiral material if lower polarization sensitivity is desired, or less chiral material if greater polarization sensitivity is desired. The use of about 1 to about 3 weight percent ZLI-811, for example, greatly reduces the polarization sensitivity of cell 10. However, the amount of chiral material is inversely related to the pitch. Using a greater amount of chiral material results in a shorter pitch, and if the pitch is too short, it becomes difficult to control the liquid crystal texture, which may result in formation of focal conic or figure print textures. Since these textures increase haze, they can reduce performance for optical applications and should be avoided.

Cell 10 is either in a resting state, in which no voltage is applied, or in an energized state, in which a voltage is applied across two substrates. The present invention can be constructed so that the application of a voltage can either increase or decrease the transmittance of light. In one embodiment the resting or de-energized state has the maximal light transmittance or "clear state", as seen in FIG. 1A, and the active or energized state has minimal light transmittance or "dark state", as seen in FIG. 1B. This can be achieved by use of a homeotropic surface treatment for alignment layers 18a,b in conjunction with a dye having positive dichroism and a liquid crystal material with negative dielectric anisotropy, as shown in FIGS. 1A and 1B.

"Clear state", as used herein, refers to the state where the guest-host mixture exhibits maximal light transmittance. "Dark state" refers to the state where the guest-host mixture exhibits minimal light transmittance.

Accordingly, in this example, the liquid crystal (LC) molecules have a first condition in the resting (no-voltage or de-energized) state in which the orientation of the dye molecule is vertical (in relation to the LC substrates), so the mixture is in a "clear-state" when no voltage is applied. When voltage is applied (energized state), the LC molecules have a second condition in which the orientation of the dye molecule is at a more parallel angle in relation to the LC substrate, so the mixture absorbs light or is in a "dark state".

Characteristics of the Guest-Dye Mixture

To achieve the desirable characteristics for a wide band variable transmission device, the dye mixture needs to have certain characteristics, described below.

Transmission Swing

A device according to the invention has a high contrast between clear and dark. The desired clear state transmission may be equal to or above 30%, preferably equal to or above 35%, 40%, 45%, 50%, 55%, 60%, 65% or 70%. The dark state transmission may be equal to or below 40%, preferably equal to or below 35%, 30%, 25%, 20%, 15% or 10%. The transmission swing between the clear and the dark state should be equal to or greater than 30%. Examples of transmission swing values include 30%, 35%, 40%, 45%, 50%, 55% or 60%. Additionally, the transmission is substantially uniform (±10%) across the surface of the cell. Such high-transmission clear states permits one to keep wearing such eyewear in many low light situations, while such low-transmission dark states provide necessary vision protection.

Wide Band Absorption

Absorption as used herein is to define the percentage of light not transmitted through the cell. It is related to transmission by the following: absorption=100%−transmission. Absorption band is defined as the spectral wavelength wherein absorption occurs. "Wide band absorption" as used herein, is defined as a spectral absorption band that is greater than 175 nm in one embodiment, and greater than 180 nm, 185 nm, 190 nm, 195 nm or 200 nm in other embodiments, where the entire spectral absorption band is contained within the range of visible wavelengths, typically assumed to be 400 nm-700 nm.

Figure 2A:
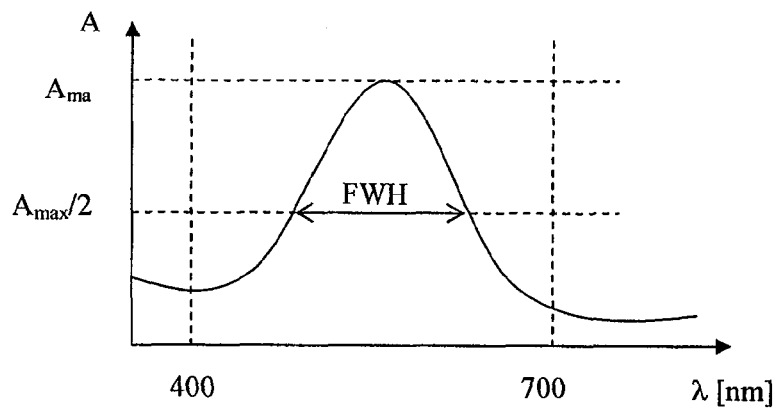
FIGS. 2A-2E are examples of graphs showing light absorption of different cells or mixtures over a range of wavelengths.

For the present invention, a "wide band dye" is considered to be any dye or mixture of dyes that results in a spectral absorption band characterized by what the Applicant calls an "Aggregate Full Width at Half Maximum" (A-FWHM) that is greater than 175 nm in one embodiment, and greater than 180 nm, 185 nm, 190 nm, 195 nm or 200 nm in other embodiments, where the entire spectral absorption band is contained within the range of visible wavelengths. An A-FWHM can be understood as follows: full width at half maximum (FWHM) is a measurement that characterizes the width of the absorption curve of the dye. It is defined as the distance between the cut-off points on the absorption curve, which occur where the absorption is one-half of the maximum absorption. See FIG. 2A. Thus, regardless of the shape of the absorption curve, the FWHM is the width of the curve between the two cut-off points where the absorption is one-half of the maximum absorption.

Figure 2B:
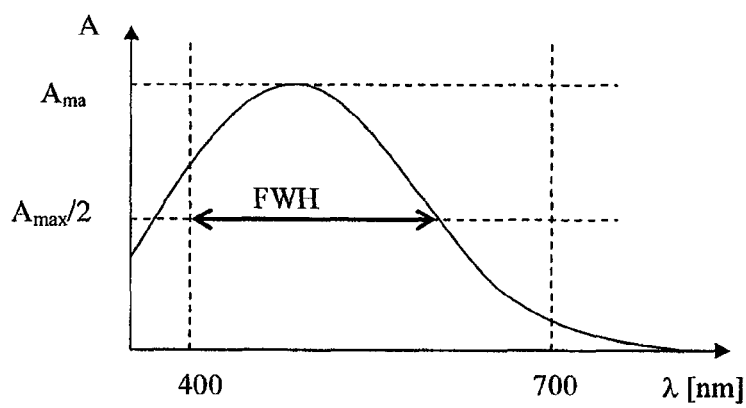
Figure 2C:
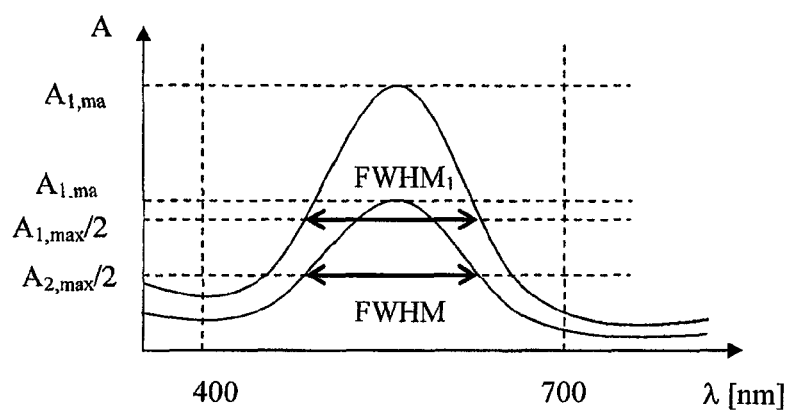
Figure 2D:
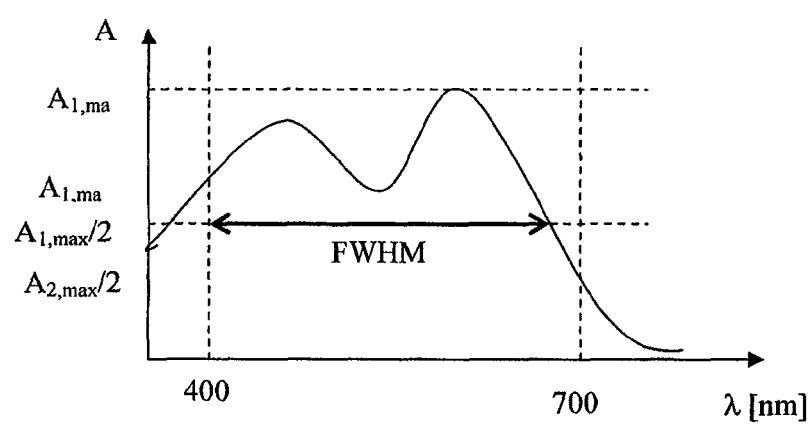
Figure 2E:
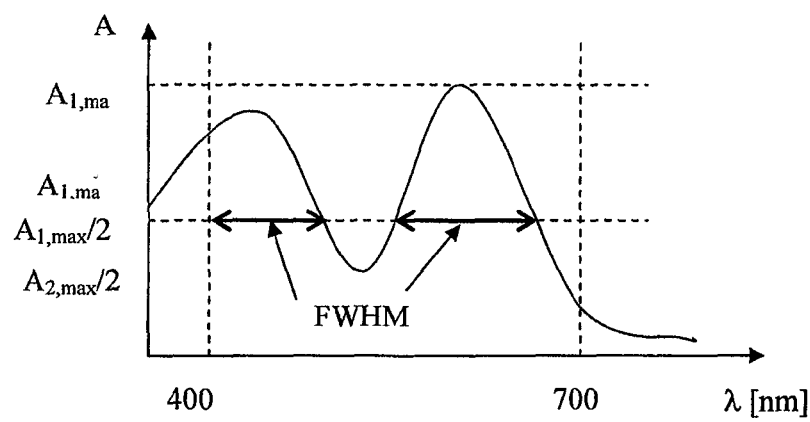

Since, for the present invention, the range of interest for absorption is limited to visible wavelengths, a cut-off point can occur at 400 nm or 700 nm even if the absorption at those wavelengths is more than one-half of the maximum absorption. See FIG. 2B. This definition of a cut-off point implies that for example dyes or mixtures which result in significantly different absorption curves could have the same FWHM (see FIG. 2C). Thus, FWHM is based solely on the distance between the cut-off points, without regard to the detailed features of the absorption curve, e.g. if the curve has a long tail, this will not affect the FWHM. Dyes with absorbance spectra that have two cut-off points are described as having a single peak, even if the detailed structure of the absorbance spectra between the cut-off points is complicated. (FIG. 2D) The present invention also includes dyes with absorbance spectra that have more than two cut-off points. Such dyes are described as having multiple peaks, where each peak is distinct and can be characterized by its own FWHM, which is measured in the same manner as described above for a single peak dye. An aggregate FWHM (A-FWHM) is defined as the sum of the FWHM of all peaks in the absorption spectrum. (See FIG. 2E). If there is only one peak, then an A-FWHM is simply the FWHM.

Order Parameter

The maximum contrast between the clear and dark states of an LC cell depends on the alignment of the dichroic dyes. Dichroic dyes have the ability to align themselves with nematic liquid crystal molecules when mixed together. When an electric field is applied to such a guest-host mixture, the nematic liquid crystal host molecules reorient and align either with or perpendicular to the electric field in order to minimize the torque they experience from the electric field. The dichroic dye (guest) molecules may not be directly affected by the external electric field but can align themselves with the liquid crystal host molecules. It is their interaction with the liquid crystal molecules that forces them to reorient.

Figure 3:
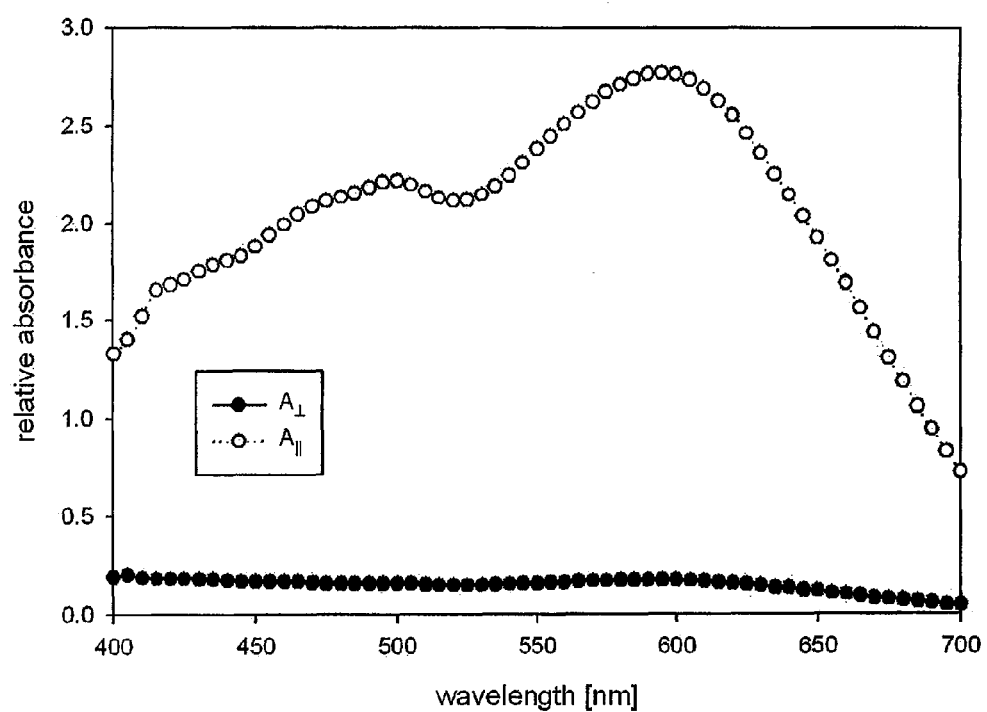
FIG. 3 is a graph showing the absorbance spectra of a wideband dichroic dye. This graph is used in calculation of the dichroic ratio and order parameter of the mixture.

The statistically averaged orientation of the elongated molecules, liquid crystal and dichroic dye, in a guest-host mixture points in a particular direction that is called the "director." Since all molecules in the mixture are subject to random thermal motion as they diffuse, each molecule will not point in exactly the same direction as the director, even when an electric field is applied. A statistical average of the molecular orientation reveals that the molecules are tilted at an average angle $\theta_{avg}$ with respect to the director. This molecular tilt can also be characterized and calculated by a useful quantity called the "order parameter, S", which ranges in value from 0 to 1. An order parameter of S=1 corresponds to all molecules being perfectly aligned with the director ($\theta_{avg}=0°$). (See *Liquid Crystals Applications and Uses*, vol. 3, edited by B. Bahadur, published by World Scientific Publishing Co. Pte. Ltd., 1992). Thus, the higher the order parameter S, the more the dichroic dye molecules are aligned, thereby optimizing absorption for any particular molecular orientation. (FIG. 3). The present invention includes a dichroic dye liquid crystal guest-host mixture with an effective order parameter $S_{mix}$ which is greater than or equal to 0.78, 0.79 or 0.8.

As used herein, the "guest-host mixture order parameter value" or "$S_{mix}$" refers to the order parameter of the guest-host mixture. The mixture may contain one or more dyes as well as other dopants. The $S_{mix}$ can be measured according to the method described herein, e.g. using the formula for $S_{eff}$ or $S_{eff\text{-}agg}$. Thus, as used herein $S_{mix}$, $S_{eff}$ and $S_{eff\text{-}agg}$ are used interchangeably (depending on which method is used to measure the order parameter) and describe the same parameter. The "dye order paramater value" or "$S_{dye}$" refers to the order parameter of the transition dipole of each dichroic dye with respect to the director.

In one example, the effective order parameter of guest host mixture containing one or more dichroic dyes exhibiting a wide absorbance spectrum (e.g. a neutral dye) is calculated as $S_{eff}=(D_{eff}-1)/(D_{eff}+2)$, where $D_{eff}=(\int A_\parallel(\lambda)d\lambda)/(\int A_\perp(\lambda)d\lambda)$ is the "effective dichroic ratio" and $A_\parallel(\lambda)$ and $A_\perp(\lambda)$ are the parallel and perpendicular absorbance of the dye at wavelength $\lambda$. Typically, $\int A_\parallel(\lambda)d\lambda$ and $\int A_\perp(\lambda)d\lambda$ are evaluated over the 380-780 nm region of the spectrum. For the present invention, these integrals are evaluated over the FWHM of the absorption spectrum of the wide band dichroic dye mixture, which, as previously described, is limited to the 400-700 nm region of the spectrum. If the absorption spectrum has a single peak, the integrals are simple to evaluate, the integration limits being the wavelengths of the end-points of the FWHM of the spectrum. If there is more than one distinct peak in the absorption spectrum, the integrals are evaluated in a piecewise fashion, the integration limits being the wavelengths of the end-points of the FWHM of each peak. This piece-wise integration produces what the Applicant calls an "aggregate dichroic ratio" $D_{eff\text{-}agg}$ and an "aggregate effective order parameter" $S_{eff\text{-}agg}$.

The order parameter of the mixture can be determined by optical measurements of the light transmission in the resting and energized states using linearly and/or circularly polarized lights at several wavelengths both within and outside of the absorption spectrum. Then, using liquid crystal optics similation methods such as those developed by Berreman, (Berreman D. W. 1972, Optics in Stratified and Anisotropic Media: 4x4-Matrix Formulation. *Journal of the Optical Society of America*, 62(4), 502). or Odano (Allia, P., Oldano, G., & Trossi, L., 1986, 4x4 Matrix approach to chyral liquid-crystal optics. *Journal of the Optical Society of America B*, 3(3), 424); the order parameter can be determined by numerical fitting to the experimental data. These simulation methods are used by those skilled in the art or through commercial programs such as *Twisted Cell Optics* by Kelly (Kelly, J., Jamal, S., & Cui, M., 1999, Simulation of the dynamics of twisted nematic devices including flow. *Journal of Applied Physics*, 86(8), 4091).

For the purposes of this invention, an order parameter of 1 also indicates that all the molecules are aligned with each other. For example, all the dichroic dye molecules are aligned with each other, presenting near identical absorption cross-sections to the incident light and maximizing absorption for that particular orientation. Of course, it must be kept in mind that perfect alignment is difficult to achieve since the molecules are always subject to thermal motion. To maximize optical performance, a guest-host mixture is desired wherein the inter-molecular alignment is increased because of the application of an external field.

In some examples, a desirable guest-host mixture will have an order parameter value $S_{mix}$ of greater than 0.78. In other examples, the $S_{mix}$ is equal to or greater than 0.79. In yet other examples, the $S_{mix}$ is equal to or greater than 0.8. Mixtures with $S_{mix}>0.78$ are needed that provide a wide transmission swing (30-70%, preferably >35%) across the A-FWHM.

In some examples, if more than one dye is used, to minimize color variation in the resting (de-energized) and energized states, it is desirable that all dyes have approximately the same order parameter.

"Dichroic ratio", "average dichroic ratio" or $D_{mix}$ of the mixture, similarly, refers to the dichroic ratio of the guest-host mixture which may contain one or more dichroic dyes. As explained above, the dichroic ratio may be measured using the formula for $D_{eff}$ or $D_{eff\text{-}agg}$. Thus, as used herein, $D_{mix}$, $D_{eff}$ or $D_{eff\text{-}agg}$ are used interchangeably (depending on which method is used to measure the dichroic ratio) and describe the same parameter.

In some examples, a desirable guest-host mixture will have a dichroic ratio $D_{mix}$ greater than 11.5 at wavelengths within the A-FWHM. In other examples, the dichroic ratio $D_{mix}$ is greater than 12, or greater than 12.5, or greater than 13 at wavelengths within the A-FWHM.

The guest-host mixture includes a chiral liquid crystal host. The chirality of the host material results in an intrinsic pitch, p, of the liquid crystal host material. This parameter is relevant to the performance. In addition, the ratio of the cell gap thickness, d, to this pitch is referred to as d/p. The pitch is a function of the helical twisting power and the concentration of the dopant, and can be determined as known in the art. For the present application the ratio d/p is less than 1, or, in some examples, less than 0.9, or in some examples, less than 0.8 or less than 0.7; where d is the separation of the substrates encapsulating the guest-host mixture and p is the intrinsic pitch of the guest-host mixture.

Solubility

A dichroic dye must also be sufficiently soluble in the liquid crystal host so that an appropriate concentration of dye can be reached to produce the desired absorption in the dark state. Increasing the length of a dye (e.g. more azo groups) creates a limit for the concentration of the dye within the liquid crystal host. This limits the total absorbing power of the LC-dye mixture, hence affecting the transmission window. The trade-offs made when selecting a dichroic dye and formulating a guest-host mixture complicate the development process for variable transmission films. We have found that structural similarities of the dye with at least one or more components of the liquid crystal host, in some instances, allow us to circumvent this limitation and increase solubility. For example, we have found that some modifications of a dye tail may not affect the overall performance of the dye but can allow additional dyes to be dissolved in the mixture. In effect, we can increase the total amount of dissolved dye by carefully matching the dye with the host. In some examples, the mixture contains 1-10% dye of order parameter of >0.78 in the liquid crystal mixture.

Tail groups include moieties that are structurally compatible with the formation of liquid crystal phases and contain at least one ring or preferably two rings or more, connected to each other through a covalent bond or a linking unit. The rings, which may be the same or different, may include 5- or 6-membered aromatic or non-aromatic rings. The rings may be selected independently from benzene, substituted benzene, naphthalene, substituted naphthalene, cyclohexane, substituted cyclohexane, heterocyclic rings and substituted heterocyclic rings. Examples of heterocyclic rings include 5- or 6-membered rings and may include one or more members selected from nitrogen, oxygen, and sulfur.

Examples of tail groups include groups that may be represented by the following formulas:

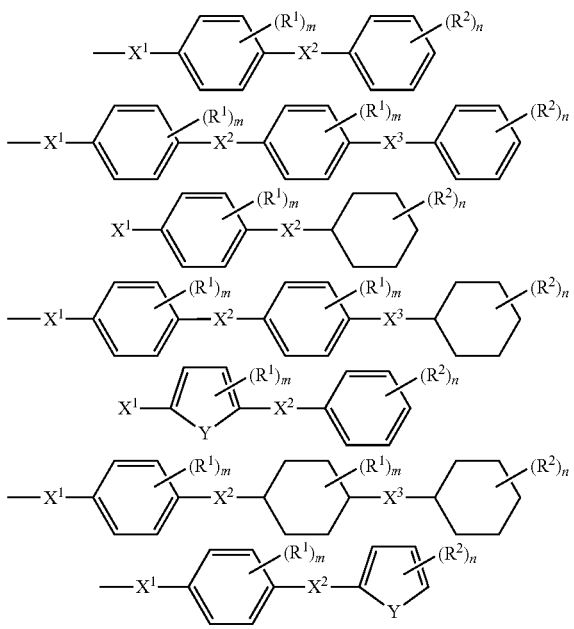

wherein each $R^1$ and $R^2$ is selected independently from the group consisting of hydrogen, halogen, —$R^a$, —OH, —$OR^a$, —O—$COR^a$, —SH, —$SR^a$, —$NH_2$, —$NHR^a$, —$NR^aR^a$, —$NR^bR^c$; wherein $R^a$ is a linear or branched ($C_{1-18}$)alkyl group, a linear or branched ($C_{1-18}$)alkenyl group or a linear or branched ($C_{1-18}$)haloalkyl group; $R^b$ and $R^c$ are independently selected from the group consisting of hydrogen and linear or branched ($C_{1-18}$)alkyl groups; or wherein $R^b$ and $R^c$ combine to form a saturated 5- to 7-member heterocyclic group. In these formulas, n is an integer from 1 to 5; m is an integer from 0 to 4; $X^1$, $X^2$, and $X^3$, identical or different from each other, are covalent bonds or linking units; and Y is oxygen, nitrogen, or sulfur. Linking units include divalent organic groups. Examples of linking units include alkyl, ether, ester, ethylene, acetylene, imino, azo, and thio groups. Linking units include groups that may be represented by the formulas —$R^d$—, —O—, —$OR^d$—, —$OR^dO$—, —OCO—, —$OCOR^d$—, —$OCOR^dO$—, —S—, —CH=CH—, —CH=N—, —C≡C—, wherein $R^d$ is a linear or branched ($C_{1-18}$)alkyl group or a linear or branched ($C_{1-18}$) haloalkyl group.

Nematic-Isotropic Temperature ($T_{NI}$)

Another important parameter is the temperature at which the liquid crystal undergoes the nematic to isotropic transition, $T_{NI}$, which is the transition from the orientationally ordered nematic phase to the totally disordered isotropic phase. In the disordered state, applying a voltage will have no effect on light transmission. We have found that for the present invention the liquid crystal mixture combined with the dye should have a $T_{NI}$ of greater than about 40° C. in one embodiment, and greater than about 65° C. in another embodiment. In some examples, the $T_{NI}$ is greater than 45° C., 50° C., 55° C., 60° C., 65° C., 70° C., 75° C., 80%, 85% or 90° C.

Adding the dye to the liquid crystal host changes the $T_{NI}$ of the mixture. Therefore the selection of the mixture must be made taking $T_{NI}$ into consideration.

Dyes

We have determined that a class of dyes which can satisfy the above conditions is azo based dyes. More particularly, we have found that dyes which have at least two azo groups are desired. The azo dye may have an extended core, e.g. 2-10 azo groups. In some examples, the dye has 2-6 azo groups. Of this group, dyes should be used that are compatible with the liquid crystalline host that will be used. People of ordinary skill in the art appreciate that the absorption band and the order parameter of the dye can be altered through proper selection of core and substituent. Some examples of the dyes that can be used in a mixture are shown in the table below. (See *Liquid Crystals Applications and Uses*, vol. 3, edited by B. Bahadur, published by World Scientific Publishing Co. Pte. Ltd., 1992, p. 73-81). For example, these dyes are sufficiently soluble in the liquid crystal hosts and the order parameter of these guest-host mixtures is equal or greater than 0.8.

| Dye | Structure | Order parameter | LC Host |
|---|---|---|---|
| G-207 | $C_3H_7O$—⌬—N=N—⌬—N=N—⌬—$C_4H_9$ | 0.826 | ZL11840 |

-continued

| Dye | Structure | Order parameter | LC Host |
|---|---|---|---|
| G-241 | [structure: C₄H₉—Ph—N=N—Ph—N=N—naphthyl—N=N—Ph—N(diethyl)] | 0.820 | MLC6609 |
| 2.27 | [structure: H₃C—NH—Ph—N=N—(2,4-diMe-Ph)—N=N—Ph—N=N—Ph—N=N—(2,4-diMe-Ph)—N=N—Ph—NH—CH₃] | 0.800 | EK22650 |

Plastic Substrates

The present inventors discovered that high-performance wide band dichroic dyes reveal optical flaws in the plastic substrates that had previously been used successfully by the Applicant with narrow band (<175 nm) dichroic dyes.

Unlike other liquid crystal based applications, the present invention requires the use of plastic substrates each with a thickness less than: 750, 500 or 250 micrometers. These can then be laminated to thicker carriers to provide mechanical stability. The substrates can be composed of thermoplastic materials, such as PET, PES, TAC, Polycarbonate, or similar materials, or thermoset materials such as CR39, or other thermoset materials known in the art. It should be noted that each plastic has unique optical properties. Our investigations showed that plastics generally exhibit optical retardation. "Optical retardation" is defined as the change in the optical phase experienced by different polarizations of incident light. As understood by people experienced in optics, optical phase depends on the refractive index, thickness of the cell, and wavelength of the incident light for each polarization. It has been assumed in the art that for optical devices based on liquid crystals the optical retardation of the substrate must be the same as the optical retardation of glass, which is zero. This has put a substantial limitation on the development of plastic eyewear devices and many plastic substrates which have an inherent retardation have been deemed unacceptable. The basis for this assumption is that since any liquid crystal device has some polarization dependence, any retardation in the substrate will be observable, and as such, only substrates with no birefringence can be used. This can be seen in the use of birefringence free plastics such as TAC for optical polarizers.

However, we have discovered that it is not the actual retardation but the relative retardation that is more important. In particular, if the plastic is designed to have retardation with less than +20% variation in uniformity across the area of the device it is possible to avoid the above limitation and achieve wide band absorption. Therefore, we have discovered that the actual retardation value limitation can be circumvented if we choose a plastic whose retardation value is more uniform across the device (i.e. less than 20% variation). This is a substantial departure from conventional thinking about plastics and opens the potential for wide absorption band devices. In particular, it is found that a variation of less than 120%, or in some examples, a variation of less than ±15% or less than ±10% is desirable. This can be most readily achieved if the plastic has overall minimal retardation, such as TAC, or if it is made to have a more consistent (+/−20%) retardation across the substrates. This can be achieved by proper stretching of plastics which have traditionally been discounted as substrates for liquid crystal optical applications including PET, PES or PC. In addition, we have discovered that the stretching mode can have a substantial effect on the performance. For optimal performance, stretching must be such that the angular deviation between the two orthogonal modes of the plastic is less than 30 degrees within the area of the optical device used. It is well known in the art that such deviations can be achieved by proper stretching methods.

Example 1

A variable transmission cell was prepared according to the following protocol. A test cell was fabricated using substrates of 5 mil polyethylene terephthalate (PET) pre-coated with a conducting polymer (Kimoto Tech, Cedartown Ga., U.S.A.). The conductive polymer served as a transparent electrode. On top of the conducting polymer, a coating of polyimide, Nissan SE1211 (Nissan Chemical Industries, Ltd., Tokyo, Japan), was applied by silk-screening and then baked at 100° C. for 2 hours. This polyimide coating served as an alignment layer designed to induce a substantially homeotropic surface alignment of the liquid crystal molecules. Next, Shinshikyu EW plastic spheres, 6 micron in diameter, (Hiko Industrial Ltd, Hong Kong) were sprayed onto one of the substrates to act as spacers. A thin bead of UV curable adhesive, Loctite 3106, (Henkel AG & Co. KGaA, Dusseldorf, Germany) was then applied around the perimeter of one of the substrates, leaving a gap that would serve as a fill port. The two substrates were then assembled, pressed together against the spacers to create a uniform gap between the substrates, and then exposed to UV light to cure the adhesive.

A guest-host mixture was then prepared that consisted of: (1) 94.8% by weight of negative dielectric anisotropy liquid crystal host, MLC-6609, from Merck (EMD Chemicals, Gibbstown, N.J., U.S.A.); which has a negative dielectric anisotropy ($\Delta\varepsilon<0$); (2) 1.125% chiral dopant, ZLI811, also from Merck; and (3) a azo based dichoric dye mixture consisting of 0.41% of dye DR-1303; (AlphaMicron, USA), 0.95% of G-241; (Marubeni Chemicals, Japan), and 2.71% total of dyes LSY-210; (Mitsubishi Chemical Corporation, Japan), DD-1123, DD1032, DD1089; (AlphaMicron Inc, USA) mixed in equal ratios. The test cell was placed in a vacuum chamber to remove air in the gap between the substrates and then filled with the guest-host mixture by capillary action. The fill port was sealed using the UV curable adhesive.

A conductive tape, consisting of a copper backing and conducting adhesive, was then adhered to the conducting polymer coating on each substrate to serve as robust interconnects for electrical leads.

Figure 4:
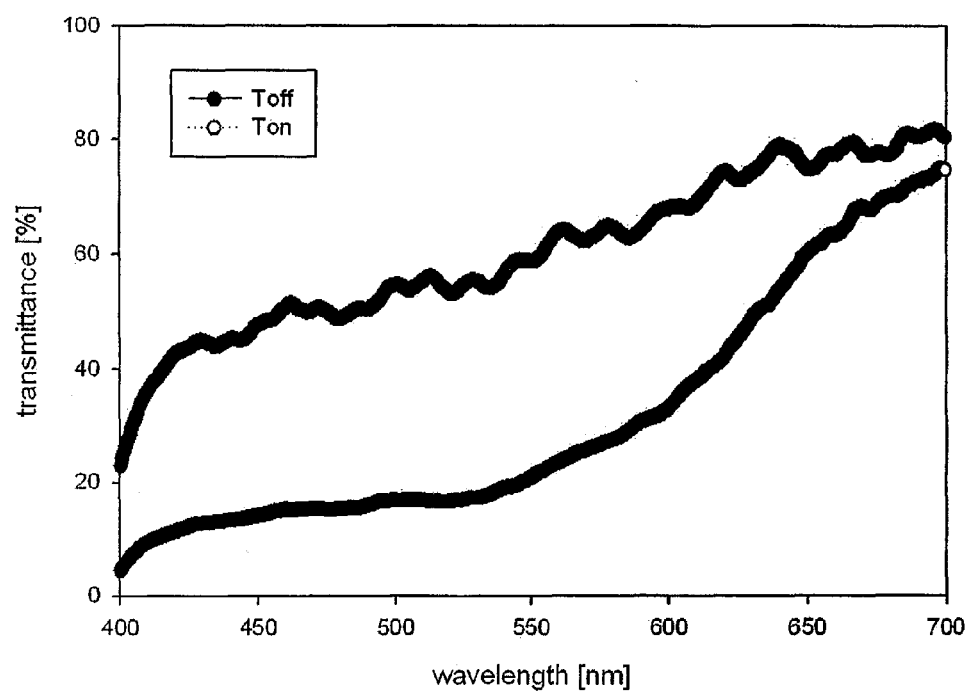
FIG. 4 is a graph showing the transmission spectra of Example 1 in the Off (top line) and On state (bottom line).

The absorption curve of the cell is shown in FIG. 4. The dichroic ratio and order parameter of the mixture were measured and calculated as described herein. The cell had a photopic transmission swing>30%, and an effective dichroic ratio of 14 (order parameter, $S_{mix}$=0.82), a d/p ratio of 0.75, and a $T_{NI}$ of 91.5° C. (LC host).

Example 2

A variable transmission cell was prepared according to the following protocol. A test cell was fabricated using substrates of 3 mil polyethylene terephthalate (PET) pre-coated with a transparent conducting ITO (Techimat, U.S.A.). On top of the conducting polymer, a coating of polyimide, Nissan SE1211 (Nissan Chemical Industries, Ltd., Tokyo, Japan), was applied by silk-screening and then baked at 100° C. for 2 hours. This polyimide coating served as an alignment layer designed to induce a substantially homeotropic surface alignment of the liquid crystal molecules. Next, Shinshikyu EW plastic spheres, 6 micron in diameter, (Hiko Industrial Ltd, Hong Kong) were sprayed onto one of the substrates to act as spacers. A thin bead of UV curable adhesive, Loctite 3106, (Henkel AG & Co. KGaA, Dusseldorf, Germany) was then applied around the perimeter of one of the substrates, leaving a gap that would serve as a fill port. The two substrates were then assembled, pressed together against the spacers to create a uniform gap between the substrates, and then exposed to UV light to cure the adhesive.

A guest-host mixture was then prepared that consisted of: (1) 95.2% by weight of negative dielectric anisotropy liquid crystal host, MLC-6609, from Merck (EMD Chemicals, Gibbstown, N.J., U.S.A.); which has a negative dielectric anisotropy ($\Delta\epsilon$<0); (2) 0.9% chiral dopant, ZLI811, also from Merck; and (3) a azo based dichoric dye mixture consisting of 0.38% of dye DR-1303; (AlphaMicron, USA), 0.76% of dye G-241; (Marubeni Chemicals, Japan), and aggregate 1.51% of dyes LSY-210; (Mitsubishi Chemical Corporation, Japan), DD-1123, DD-1032, DD-1089; (Alpha-Micron Inc, USA) in equal amounts and aggregate 1.2% of DD-1112, DD-1215 (AphaMicron USA) in a 2:1 ratio respectively. The test cell was placed in a vacuum chamber to remove air in the gap between the substrates and then filled with the guest-host mixture by capillary action. The fill port was sealed using the UV curable adhesive. A conductive tape, consisting of a copper backing and conducting adhesive, was then adhered to the conducting polymer coating on each substrate to serve as robust interconnects for electrical leads.

Figure 5:
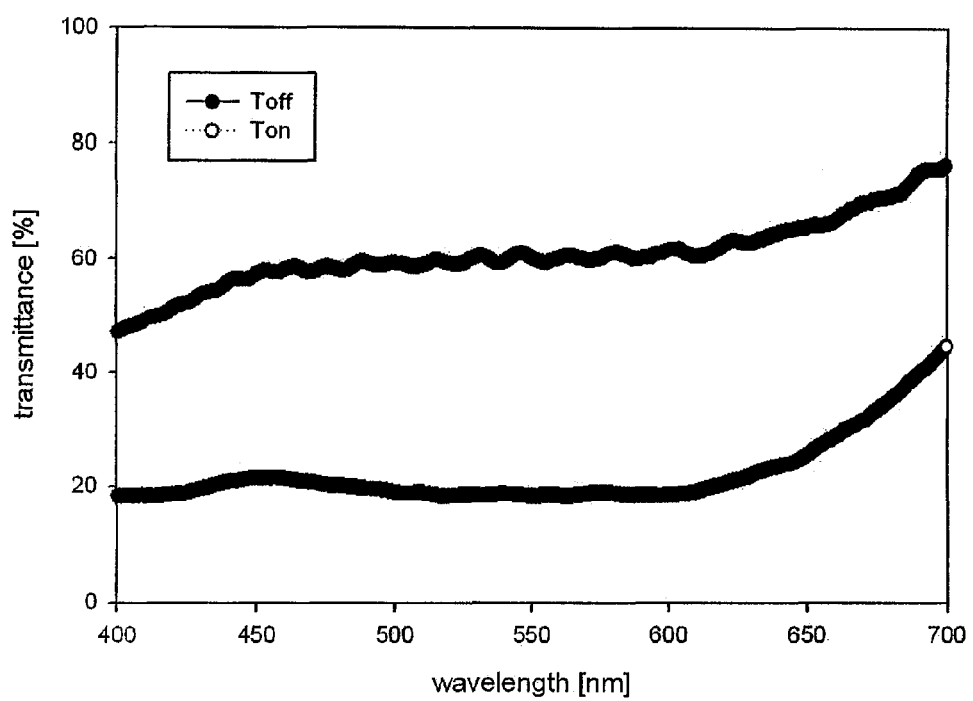
FIG. 5 is a graph showing the transmission spectra of Example 2 in the Off (top line) and on (bottom line) states.

The absorption curve of the cell is shown in FIG. 5. The dichroic ratio and order parameter of the mixture were measured and calculated as described herein. The cell had a photopic transmission swing of 40%, and an effective dichroic ratio of 15 (order parameter, $S_{mix}$=0.83), a d/p ratio of 0.5, and a $T_{NI}$ of 93° C. (LC host).

The invention claimed is:

1. An optical device comprising:
   a cell comprising a guest-host mixture of a liquid crystal host and a dichroic guest dye material contained between a pair of plastic substrates,
   wherein the liquid crystal host has an axis orientation that is alterable between a clear state orientation when no voltage is applied to the cell and a dark state orientation perpendicular thereto when a voltage is applied to the cell;
   wherein the liquid crystal host comprises a chiral nematic material with a thickness to pitch ratio (d/p) of less than 0.9 but greater than 0.25;
   wherein the dichroic guest dye material comprises one or more dichroic dyes;
   wherein said guest-host mixture has an order parameter, $S_{mix}$, greater than 0.78 and a nematic-isotropic transition temperature $T_{NI}$ greater than 40° C.;
   wherein said pair of plastic substrates have an optical retardation with less than ±20% variation in uniformity for any given wavelength of incident light;
   wherein the optical device does not use polarizers;
   wherein the optical device exhibits a wide absorption band having an aggregate full width at half maximum (A-FWHF) that is greater than 175 nm within a visible wavelength range of 400-700 nm; and
   wherein the optical device has a variable transmission with a dark state transmission equal to or below 40% and a transmission swing between the clear state orientation and the dark state orientation greater than or equal to 30%.

2. The optical device of claim 1, wherein said guest-host mixture has a dichroic ratio $D_{mix}$ greater than 11.5.

3. The optical device of claim 1, wherein said one or more dichroic dyes in the dichroic guest dye material are azo-based dyes having at least two azo groups.

4. The optical device of claim 3, wherein said azo-based dyes have 2-6 azo groups.

5. The optical device of claim 1, wherein said cell has a cell gap greater than 3 but less than 20 microns.

6. The optical device of claim 1, further having a transmission swing greater than or equal to 40%.

7. The optical device of claim 1, wherein said guest-host mixture has an order parameter, $S_{mix}$, greater than or equal to 0.79.

8. The optical device of claim 1, wherein said guest-host mixture has an order parameter, $S_{mix}$, greater than or equal to 0.8.

9. The optical device of claim 1, wherein:
   said guest-host mixture comprises one or more dichroic dyes with a dichroic ratio greater than 11.5;
   said guest-host mixture has a nematic-isotropic transition temperature $T_{NI}$ greater than 60° C.;
   said cell has a cell gap greater than 3 but less than 20 microns; and
   said device has a transmission swing greater than or equal to 40%.

10. A guest-host mixture comprising a mixture of a liquid crystal host having a negative dielectric anisotropy and a dichroic guest dye material having positive dichroism;
   wherein the liquid crystal host has an axis orientation that is alterable between a clear state orientation in the absence of a voltage and a dark state orientation perpendicular thereto when a voltage is applied;
   wherein the dichroic guest dye material comprises one or more dichroic dyes;
   wherein said guest-host mixture has an order parameter, $S_{mix}$, greater than 0.78 and a nematic-isotropic transition temperature $T_{NI}$ greater than 40° C.;
   wherein the gust-host mixture exhibits a wide absorption band that is greater than 175 nm within a visible wavelength range of 400-700 nm; and
   wherein the guest-host mixture has a dark state transmission equal to or below 40% and a transmission swing between the clear state orientation and the dark state orientation greater than or equal to 30%.

11. The guest-host mixture of claim 10 wherein said guest-host mixture has a transmission swing of greater than 50%.

12. The guest-host mixture of claim 11, wherein said guest-host mixture comprises one or more dichroic dyes with a dichroic ratio greater than 13.

13. The guest-host mixture of claim 10, wherein said guest-host mixture has a clear state transmission equal to or above 60% and a dark state transmission equal to or below 30%.

14. The optical device of claim 1, wherein said optical device exhibits a wide absorption band with a A-FWHF that is greater than 190 nm within said visible wavelength range.

15. The optical device of claim 1, wherein the liquid crystal host has negative dielectric anisotropy and the dichroic dye guest has positive dichroism.

* * * * *

UNITED STATES PATENT AND TRADEMARK OFFICE
CERTIFICATE OF CORRECTION

| | | |
|---|---|---|
| PATENT NO. | : 9,134,551 B2 | Page 1 of 1 |
| APPLICATION NO. | : 13/877508 | |
| DATED | : September 15, 2015 | |
| INVENTOR(S) | : Ludmila Sukhomlinova et al. | |

It is certified that error appears in the above-identified patent and that said Letters Patent is hereby corrected as shown below:

In the claims

In Column 16, line 60 (Claim 10) the word "gust-host" should read --guest-host--.

Signed and Sealed this
Seventh Day of June, 2016

Michelle K. Lee
*Director of the United States Patent and Trademark Office*